United States Patent [19]
Kobayashi et al.

[11] Patent Number: 4,800,751
[45] Date of Patent: Jan. 31, 1989

[54] SYSTEM FOR DETECTING LOAD APPLIED TO SUSPENSION

[75] Inventors: Hiroshi Kobayashi; Hiroaki Ohbayashi, both of Kanagawa, Japan

[73] Assignee: Nissan Motor Company, Limited, Japan

[21] Appl. No.: 56,761

[22] Filed: Jun. 2, 1987

[30] Foreign Application Priority Data

Jun. 3, 1986 [JP] Japan ................... 61-128332

[51] Int. Cl.⁴ .......................................... G01M 17/04
[52] U.S. Cl. ................... 73/118.1; 73/862.65
[58] Field of Search ............ 73/118.1, 862.62, 862.64, 73/862.65, 862.66; 180/41

[56] References Cited

FOREIGN PATENT DOCUMENTS

| 519624 | 12/1955 | Canada ............ 73/862.62 |
| 57-37008 | 2/1982 | Japan . |
| 60-106807 | 7/1985 | Japan . |
| 60-155610 | 10/1985 | Japan . |

Primary Examiner—Jerry W. Myracle
Attorney, Agent, or Firm—Leydig, Voit & Mayer

[57] ABSTRACT

A system for detecting a load applied to a suspension assembly includes a strain gauge integrally provided on a component of an insulator member of the suspension assembly. The load is detected by a detecting circuit comprising a Wheatstone bridge formed by the strain gauge and a plurality of fixed resistors, a power supply and a strain amplifier.

16 Claims, 15 Drawing Sheets

FIG. 5
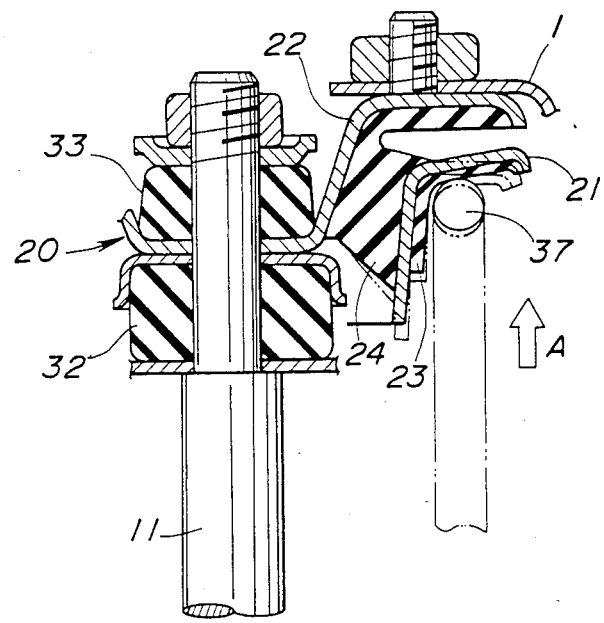
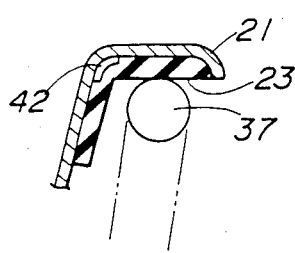
FIG.6(a)
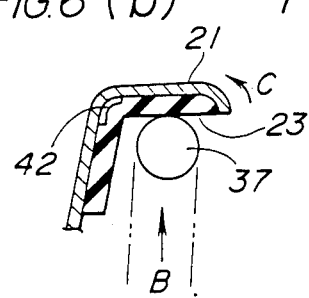
FIG.6(b)
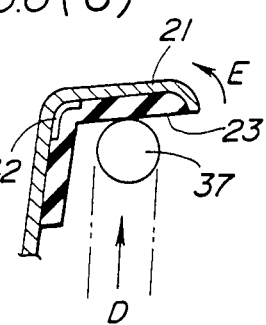
FIG.6(c)

FIG. 9(a)
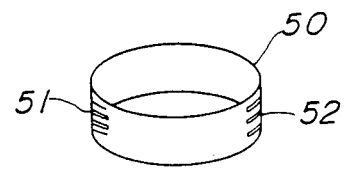
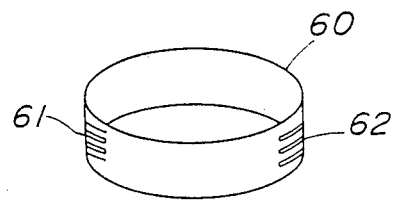
FIG. 9(b)
FIG. 10
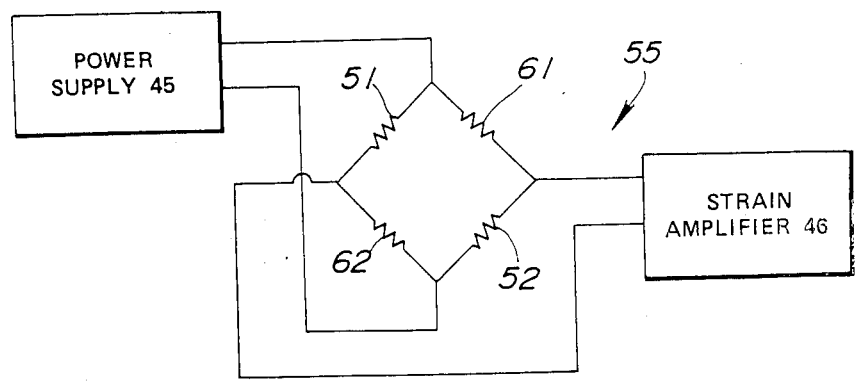

SYSTEM FOR DETECTING LOAD APPLIED TO SUSPENSION

BACKGROUND OF THE INVENTION

1. Field of the Invention

The present invention relates to a system for detecting a load applied to a suspension. More specifically, the invention relates to a load detecting system, in which a strain gauge is provided.

2. Description of the Prior Art

A system for detecting a load, which is applied to the suspension of an automotive vehicle, a motor cycle and so forth, is described in the Japanese Patent First Publication (Jikkai) No. Showa 57-37008. This system includes a pair of strain gauges, which are mounted on shafts connecting the ends of suspension assemblies of a two-wheeler with the vehicle frame, and a pair of fixed resistors. The strain gauge and the fixed resistance constitute a Wheatstone bridge which detects load applied to an air suspension. In this system, not only the usual components of the suspension but also a supporting shaft, to which the strain gauge can be secured, are required in order to detect a load. Therefore, the number of parts is large and its construction is complicated. In addition, a strain gauge is attached to both ends of the suspension assembly, i.e. to the supporting shafts of both of the sprung and the unsprung mass, respectively. One of the strain gauges is separated from the other by a great distance. Therefore, it is difficult to compensate for temperature difference between the strain gauges. Furthermore, the durability of each strain gauge is not very good since it is attached by means of an adhesive agent. In this system, the strain gauges are attached to the suspension assembly after the suspension assembly is mounted on the vehicle body. Therefore, the installation procedure is complicated and it is difficult to determine the optimum mounting point. In addition, it is difficult to establish a lead wire from the strain gauge of the movable unsprung mass to the sprung mass, that is not influenced by the displacement of the suspension.

Another system for detecting a load applied to the suspension of an automotive vehicle is described in the Japanese Patent First Publication (Jikkai) No. Showa 60-106807. This system includes an elastic body provided between a suspension spring and the vehicle body. The elastic body is comprised of, for example, an insulating rubber, on a part of which a conducting rubber layer is formed. This system may detect a load applied to the suspension by the variation of the resistance value of the conducting rubber layer according to the deformation of the elastic body. However, a certain amount of carbon black is added to the rubber used for elastic members for automotive vehicles in order to give it the required hardness and durability. Therefore, this causes the rubber to have some conductivity. The resistance value or the conductivity of the rubber varies according to the ratio and compounding manner of the carbon black and rubber. In general, there is about 20% to 30% variation in conductivity between samples. In addition, the conducting rubber layer may alternatively include a metal strip, the conductivity of which varies under the same conditions as described above. Therefore, when such a member is used as a detecting member, it is difficult to accurately detect a load applied to the suspension on the basis of variation of the conductivity, i.e. variation of the resistance since the conductivity of the elastic member varies between samples and the proportion of the variation is not constant.

Another system is further described in the Japanese Patent First Publication No. Showa 59-43205. This system includes a load detecting device comprised of a piezo-electric device which is mounted on the upper end of a shock absorber. The piezo-electric device is fixed to the vehicle body with the shock absorber when the shock absorber is mounted on the vehicle body. The system may detect load applied to the suspension by means of electric signals produced from the piezo-electric device. However, loads on the basis of the upward and downward movement of the suspension while driving the vehicle are continually applied to the position where the piezo-electric device is disposed. Therefore, looseness due to wear may occur at the thread fastening point decreasing the sensitivity of load detection after a number of years. In addition, although the system may detect the varied value of the applied loads, it can not detect continuous loads or the absolute value of the loads.

SUMMARY OF THE INVENTION

It is, therefore, a principal object of the present invention to overcome the aforementioned disadvantages and to provide a load detecting system which can detect a load applied to a suspension assembly of a vehicle by means of a strain gauge which is integrally provided on a component of an insulator assembly of the suspension assembly.

In order to accomplish the aforementioned and other specific objects, a system for detecting a load applied to a suspension assembly, according to the invention, includes a strain gauge integrally provided on a component of an insulator assembly of said suspension assembly. The insulator assembly is deformed according to the load and the strain gauge is deformed according to the deformation of the insulator assembly. The resistance of the strain gauges varies according to the deformation thereof. Therefore, the load can be detected by detecting means which is composed of a Wheatstone bridge circuit formed by the strain gauge and a plurality of fixed resistors, a power supply and a strain amplifier.

According to one aspect of the invention, a system for detecting a load applied to a suspension assembly of a vehicle, which comprises:

a strain gauge integrally provided on a load component of an insulator assembly of said suspension assembly, the component being deformed according to the load and the gauge being deformed according to the deformation of the component; and a detecting means for outputting an electrical signal on the basis of the resistance of the strain gauge and for detecting the load, the resistance being varied according to the deformation of the strain gauge.

The detecting means may comprise a Wheatstone bridge, which is formed by the strain gauge and a plurality of fixed resistors, a power supply and a strain amplifier. The component may be a mounting assembly. The mounting assembly comprises:

a supporting ring which supports the upper end of a suspension spring provided between the upper and lower ends of a shock absorber of the suspension assembly;

a mounting portion fixed to the vehicle body; and an elastic insulator rubber which is provided between the supporting ring and the mounting portion. In this case, the supporting ring may have an essentially cylindrical portion and a flange provide around the cylindrical portion and be deformed according to a load applied to the vehicle body by the suspension spring. Preferably, the strain gauge is integrally fixed to the upper or lower surface of the supporting ring at a portion of the junction between the cylindrical portion and the flange, by way of sputtering or vapor deposition, in order to detect a load applied to the vehicle body by the suspension spring. In addition, the strain gauge includes two strain gauges which are provided on the supporting ring at two diametrically opposing locations of the junction.

The load bearing member may be first and/or second members which are deformed according to a load applied to the vehicle body by a shock absorber of the suspension assembly. In this case, the stain gauge may be deformed according to the deformation of the first and/or second members causing the resistance thereof to vary. Preferably, first and second thin metallic ring-shaped members, respectively, are provided in the first and second members. In this case, the strain gauge may be integrally fixed to the first and/or second ring-shaped members by way of sputtering or vapor deposition. The first and second ring-shaped members include two diametrically opposing strain gauges, respectively.

The component of the insulator assembly may be an insulator rubber of the suspension assembly, the insulator rubber being deformed according to a load applied to the vehicle body by the suspension spring and the shock absorber. In this case, the strain gauge may be deformed according to the deformation of the insulator rubber causing the resistance thereof to vary. Preferably, a thin metallic disc-shaped member may be provided in the insulator rubber, the disc-shaped member being deformed according to the deformation of the insulator rubber caused by a load applied to vehicle by the suspension spring and the shock absorber. The strain gauge is preferably fixed to the disc-shaped member by way of sputtering or vapor deposition, the strain gauge being deformed according to the deformation of the disc-shaped member. In this case, the strain gauge includes two diametrically opposing strain gauges.

The strain gauge may be integrally fixed to the mounting portion by sputtering or vapor deposition, the mounting portion being deformed according to a load applied to the suspension by the vehicle body and a load applied to the vehicle body by the suspension, and the strain gauge being deformed according to the deformation of the mounting portion.

BRIEF DESCRIPTION OF THE DRAWINGS

In the drawings:

FIG. 5 and FIGS. 6(a) to (c) are views showing the deformation of a supporting ring caused by the load;

FIGS. 9(a) and (b) are perspective views of rings provided in the suspension assembly of FIG. 8;

FIG. 10 is a block diagram of a second load-detecting section according to the second preferred embodiment of the invention;

DESCRIPTION OF THE PREFERRED EMBODIMENT

Figure 1:
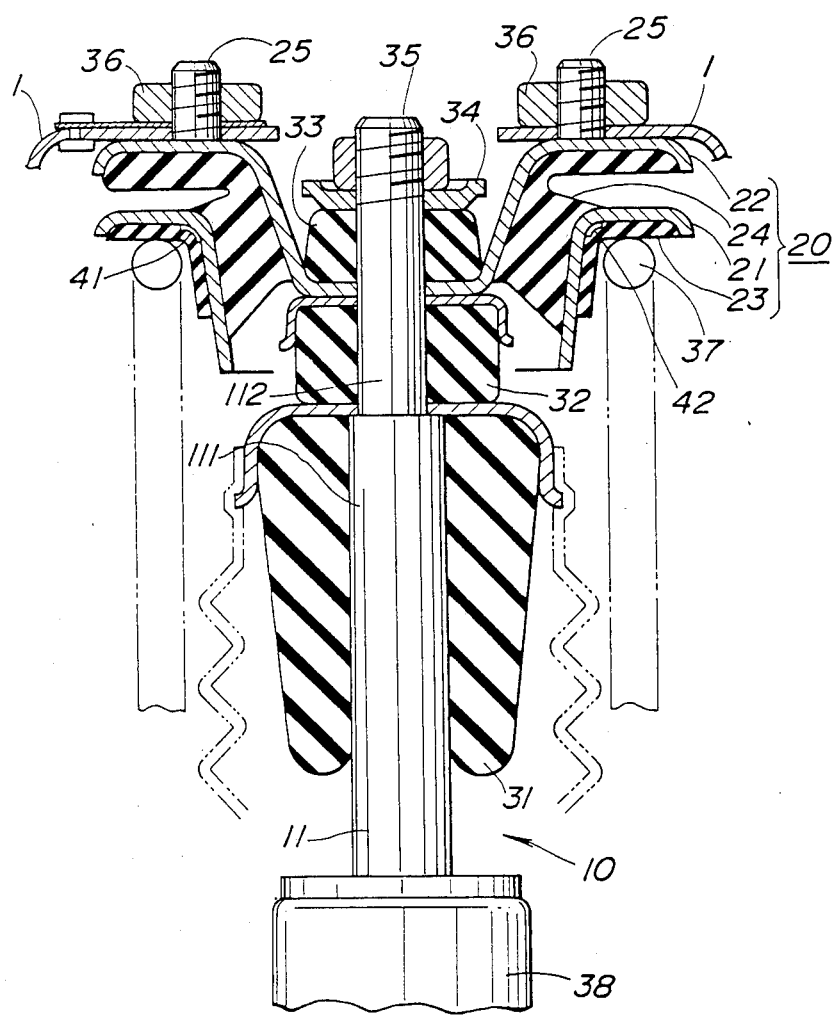
FIG. 1 is a section of a suspension assembly, in which strain gauges, according to the first preferred embodiment of the present invention, are provided.

Referring now to the drawings, first to fourth preferred embodiments of a system for detecting a load applied to a suspension assembly, according to the present invention, are described below. In these embodiments, the system of the invention is applied to a strut type suspension assembly. Three types of loads are applied to the strut suspension assembly when the vehicle is stopped and while it is driven: load (1) applied to the vehicle by a suspension spring, load (2) applied to the vehicle by a shock absorber and load (3) applied to the vehicle by the suspension spring and shock absorber. Strain gauges are provided so that loads (1) to (3) are detected in the first to third embodiments. In addition, in the fourth embodiment strain gauges are provided so that load applied to the suspension assembly by the vehicle body and load applied to the vehicle body by the suspension assembly is detected.

The first embodiment of a load-detecting system according to the invention is described below.

As shown in FIG. 1, the strut suspension assembly comprises a shock absorber 10, bumper rubbers 31, 32 and 33, a mount 20, a suspension spring 37 and a shock absorber body 38, the lower end of which is mounted on a wheel not shown. A piston rod 11 of the shock absorber 10 comprises a large diameter portion 111 and a small diameter portion 112. The large diameter portion 111 is sealingly inserted into the bumper rubber 31 which is made of elastic material. The small diameter portion 112 is sealingly inserted into the bumper rubber 32. The mount 20 is fixed to the bumper rubber 32 and the bumper rubber 33 is fixed to the mount 20 by means of a washer 34 and a nut 35. A bolt 25 projecting upwardly from the upper surface of the mount 20 passes through a vehicle body 1 to engage a nut 36 so as to allow the mount 20 to be fixed to the vehicle body 1.

Figure 2:
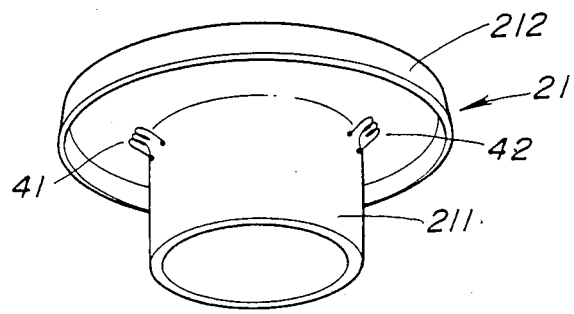
FIG. 2 is a perspective view of a supporting ring provided in the suspension assembly of FIG. 1.

The mount 20 comprises a metallic supporting ring 21, which supports the upper end of the suspension spring 37 provided between the upper and lower ends of the shock absorber 10, and a metallic mounting portion 22 fixed to the vehicle body 1. A elastic body 23 is provided on the lower surface of the supporting ring 21. An insulator rubber 24 made of an elastic material is provided between the supporting ring 21 and the mounting portion 22. As shown in FIG. 2, the supporting ring 21 comprises a cylindrical portion 211 and a flange 212. A pair of strain gauges 41 and 42 are fixed to the supporting ring 21 at portions of the junction between the cylindrical portion 211 and the flange 212, so as to be opposite side of the cylindrical portion 211. They are formed by way of a vacuum deposition, for example, sputtering. The strain gauges 41 and 42 are covered by the elastic body 23.

Figure 3:
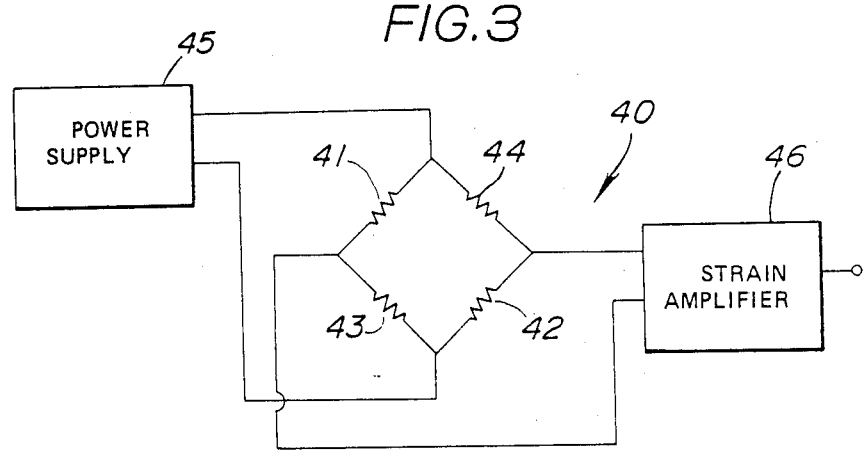
FIG. 3 is a block diagram of a first load-detecting section according to the first preferred embodiment of the invention.
Figure 4:
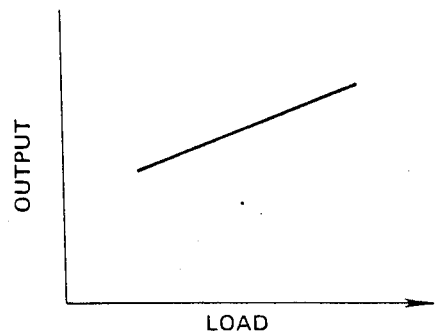
FIG. 4 is a graph showing the relationship between the load and the output in the first load-detecting section of FIG. 3.

As shown in FIG. 3, a Wheatstone bridge is formed by the strain gauges 41 and 42 and fixed resistors 43 and 44. The Wheatstone bridge is connected to a power supply 45 and a strain amplifier 46 to constitute a first load detecting section 40. When the resistance value of the strain gauges 41 and 42 is varied by the deformation thereof in accordance with the deformation of the supporting ring 21 caused by a load applied thereto by means of the suspension spring 37, the balance of the Wheatstone bridge is varied so that an electrical signal is produced. The signal is amplified and outputted, thereby the load applied to the vehicle body by means of the suspension spring 37 is detected. The relationship between the output of the strain amplifier 46 and loads applied by means of the suspension spring 37 is shown in FIG. 4.

Referring to FIGS. 5 and 6(a) to (c), the load detecting process is described below. When a load is applied to the supporting ring 21 by means of the suspension spring 37 in the direction indicated by the arrow A in FIG. 5, the supporting ring is deformed as shown in FIG. 5. When no load is applied to the supporting ring 21, it supports the suspension spring 37 so as to have the shape shown in FIG. 6(a). When a small load expressed by the arrow B in FIG. 6(b) is applied to the supporting ring 21, it is deformed in the direction indicated by arrow C in FIG. 6(b). In addition, when a large load expressed by the arrow D in FIG. 6(c), it is further deformed in a direction of the arrow E in FIG. 6(c). In accordance with such deformation of the supporting ring 21, the strain gauges 41 and 42 are deformed causing the resistance thereof to vary. As a result, the balance of the Wheatstone bridge shown in FIG. 3 varies so that, as shown in FIG. 4, an electrical signal, which is proportional to the deformation, is outputted from the strain amplifier 46, thereby amount of the load applied to the vehicle body 1 by means of the suspension spring 37 can be detected.

The following are some examples of uses to which the information output by the strain amplifier 46 can be put.

When the vehicle is stopped, the load applied by the vehicle body is transferred to the suspension spring 37 by means of the insulator rubber 24. A spring reaction force corresponding to the load applied by the vehicle body, which is transferred to the suspension spring 37, is detected by means of the load detecting section 40. If the spring reaction force, i.e. the load, which is applied to each of four suspensions assemblies by the vehicle body, is detected, the load applied to each of the front and rear wheels can be detected. Therefore, the weight distribution of the vehicle at the front and rear wheels can be determined. As a result, when braking the vehicle, the braking force applied to each of the front and rear wheels can be controlled in accordance with the vehicle weight distribution.

While the vehicle is moving, the load applied to the suspension spring 37 varies according to road conditions. That is, tire traction varies according to road conditions, thereby causing the amount of load applied to the wheels to vary. The loads applied to the wheels are transferred to the vehicle body via the suspension assemblies supporting the vehicle body. Therefore, the load applied to the ground by each of the wheels, which varies according to tire traction, can be detected by the variation of the loads applied to the suspension assemblies. According to the first preferred embodiment of a suspension load detecting system of the invention, the load component applied to the suspension spring 37 by means of the insulator rubber 24 and the load component applied to the suspension spring 37 from the shock absorber 10 by means of the supporting ring 21 can be detected. Therefore, variation in road conditions can be determined by detecting the load applied to the suspension spring 37, so that the damping force of the shock absorber 10 can be controlled in accordance with the road conditions. Therefore, according to the first preferred embodiment, the occupant can obtain a good ride even while the vehicle travels on a rough road by controlling the damping force of the shock absorber 10.

When a steering force and/or a braking force are applied to the vehicle, a pitching or rolling motion is caused. According to the first preferred embodiment, the vehicle attitude can be determined by detecting the load applied to each of the four suspension springs 37. Therefore, when a rolling motion occurs, the dumping force of the shock absorber 10 can be controlled so as to restrict the rolling motion. In addition, the pitching or diving motion when braking or accelerating the vehicle can be determined by detecting the load applied to each of the four suspension springs 37. Therefore, the damping force of the individual shock absorbers 10 can be controlled so as to restrict pitching or diving.

As mentioned above, according to the first preferred embodiment of the invention, since the strain gauges 41 and 42 are formed on the supporting ring 21 of the mount 20 which constitutes a strut suspension by way of sputtering or deposition and are covered with the elastic body 23, the strain gauges can be mounted on the suspension without complicating construction of the suspension. In addition, the strain gauges 41 and 42 can be accurately positioned so that the load can be detected accurately. Since the strain gauges are not attached by means of an adhesive agent, their durability can be increased. In addition, since the strain gauges 41 and 42 are provided at the upper end of the suspension assembly, i.e. at the sprung mass end and are protectively covered by the elastic bodies, the durability can be increased still further. Since a pair of strain gauges 41 and 42 are positioned so as to be relatively close each other, temperature differences between them are negligible. In addition, since the strain gauges 41 and 42 are provided on the suspension assembly at a location on or near the sprung mass, the load can be easily established.

Figure 7:
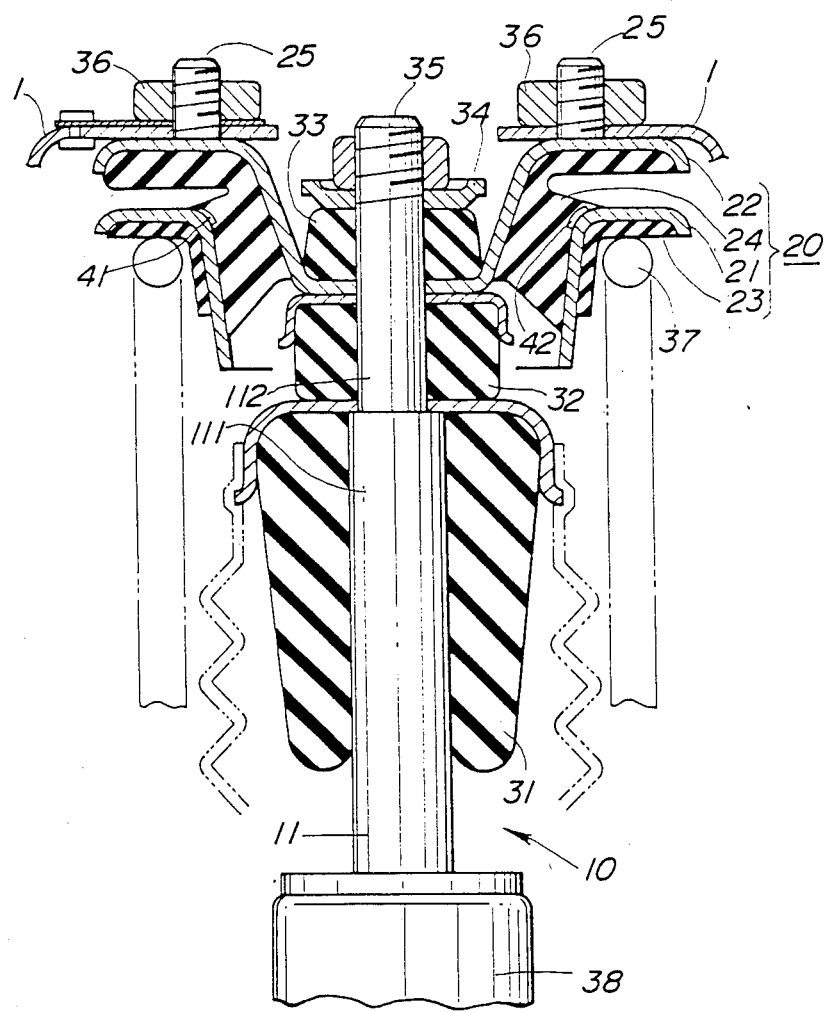
FIG. 7 is a section of a suspension assembly, in which the strain gauges are provided at another location according to the first preferred embodiment.

As shown in FIG. 7, according to the first preferred embodiment of the invention, the strain gauges 41 and 42 may alternatively be mounted on the upper surface of the supporting ring 21 at the junction between the cylindrical portion 211 and the flange 212 and be protectively covered by the insulator rubber 24.

The second embodiment of a load-detecting system according to the invention is described below.

Figure 8:
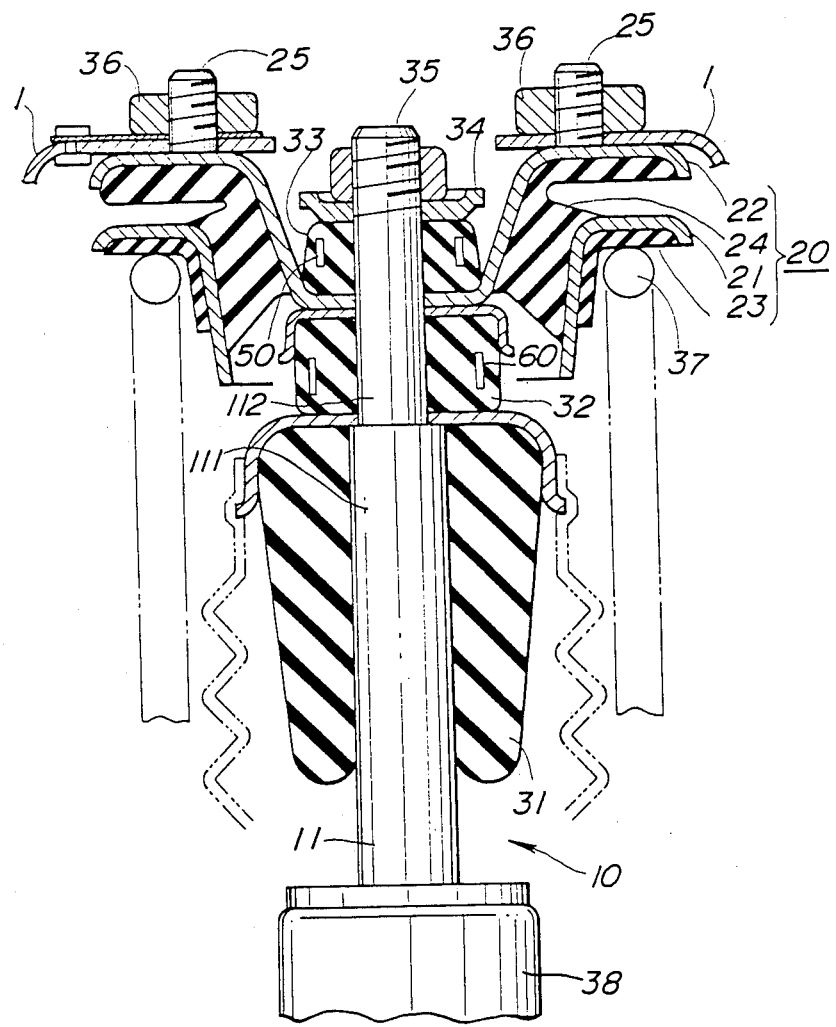
FIG. 8 is a section of a suspension assembly, in which strain gauges, according to the second preferred embodiment of the invention, are provided.

As shown in FIG. 8, a ring 50 shown in FIG. 9(a), which is made of a thin metallic plate, is provided in the bumper rubber 33 and a ring 60 shown in FIG. 9(b), which is also made of a thin metallic plate, is provided in the bumper rubber 32. As shown in FIGS. 9(a) and (b), a pair of strain gauges 51 and 52 or 61 and 62 respectively are fixed to the outer surface of each of the rings 50 and 60 on opposite sides by way of, for example, sputtering or vapor deposition. As shown in FIG. 10, a Wheatstone bridge is formed by connecting the strain gauges 51, 52, 61 and 62 to each other. The Wheatstone bridge is connected to the power supply 45 and the strain amplifier 46 to constitute a second load-detecting section 55.

Figure 11:
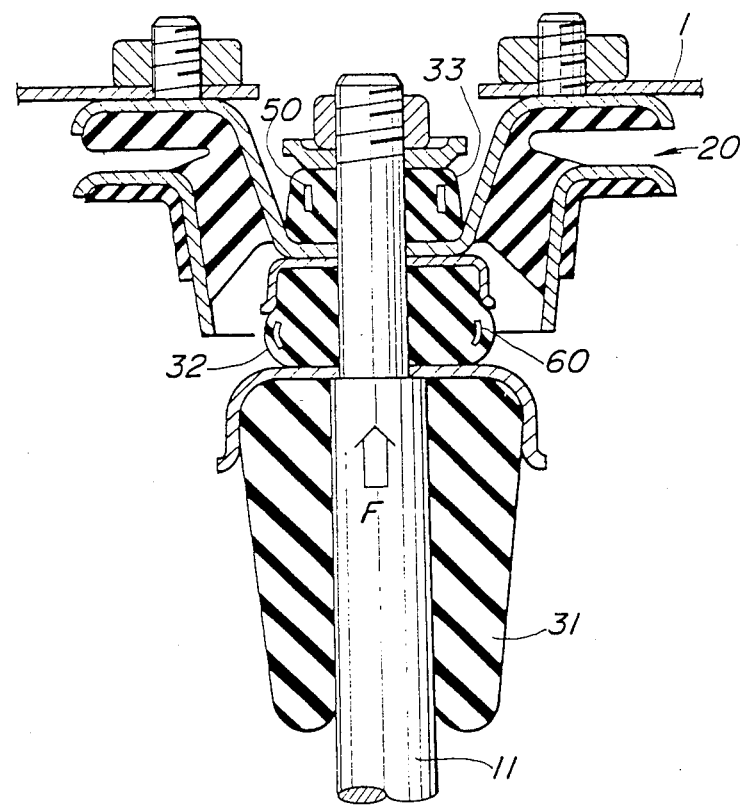
FIGS. 11 and 12 are views showing the deformation of the rings.

When the load from the vehicle body is applied to the wheels by means of the suspension assemblies, the load is upwardly applied to the bumper rubber 32 by the shock absorber 10 as expressed by the arrow F in FIG. 11 compressing the bumper rubber 32. As a result, a force is applied to the ring 60 provided in the bumper rubber 32, which causes the ring 60 to deform as shown in FIG. 11. Since the strain gauges 61 and 62 integrally provided on the ring 60 are deformed in accordance with the deformation of the ring 60, the resistance thereof is varied so that an electrical signal is outputted from the strain amplifier 46 that is proportional to the deformation, thereby the amount of load applied to the vehicle body 1 by means of the shock absorber 10 can be detected.

Figure 12:
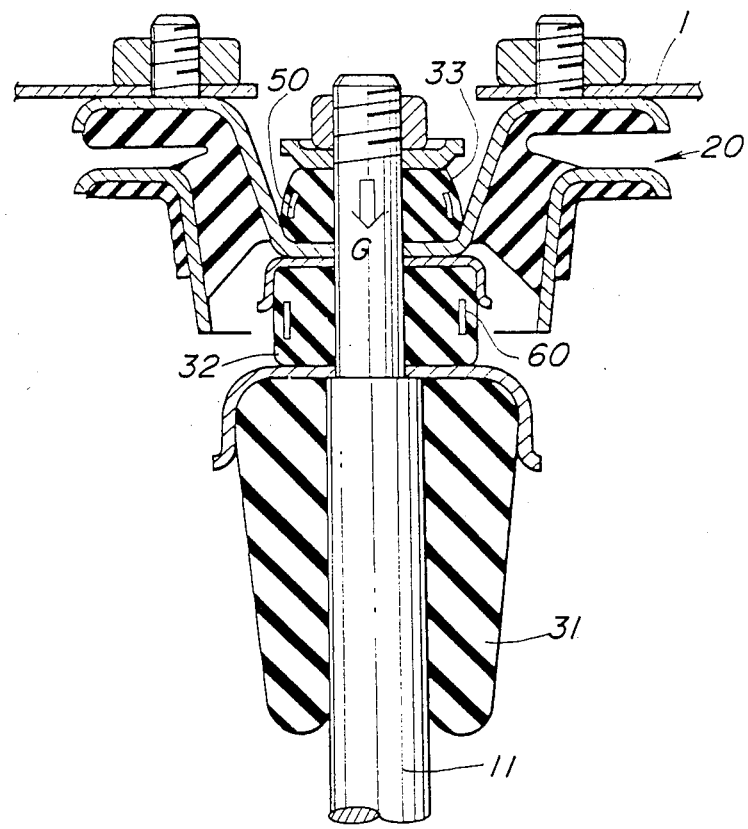

On the other hand, when a load is downwardly applied as expressed by the arrow G in FIG. 12, the bumper rubber 33 is compressed by the load. As a result, a force is applied to the ring 50 provided in the bumper rubber 33 which causes the ring 50 to deform as shown in FIG. 12. Since the strain gauges 51 and 52 are deformed in accordance with the deformation of the ring 50, the resistance thereof is varied causing an electrical signal, which is proportional to the deformation, to be outputted from the strain amplifier 46.

The aforementioned load detected by the second load-detecting section 55 is the load applied to the shock absorber 10. Therefore, the damping force of the shock absorber 10 can be varied in accordance with the detected load. That is, the damping force of the shock absorber 10 is increased when the large load is applied to the shock absorber 10 and the damping force of the shock absorber 10 is decreased when the load applied to the shock absorber 10 is small, so that the oscillation of the sprung mass caused by the road and/or steering conditions and the vehicle attitude can be controlled.

The third preferred embodiment of a load-detecting system according to the invention is described below.

Figure 13:
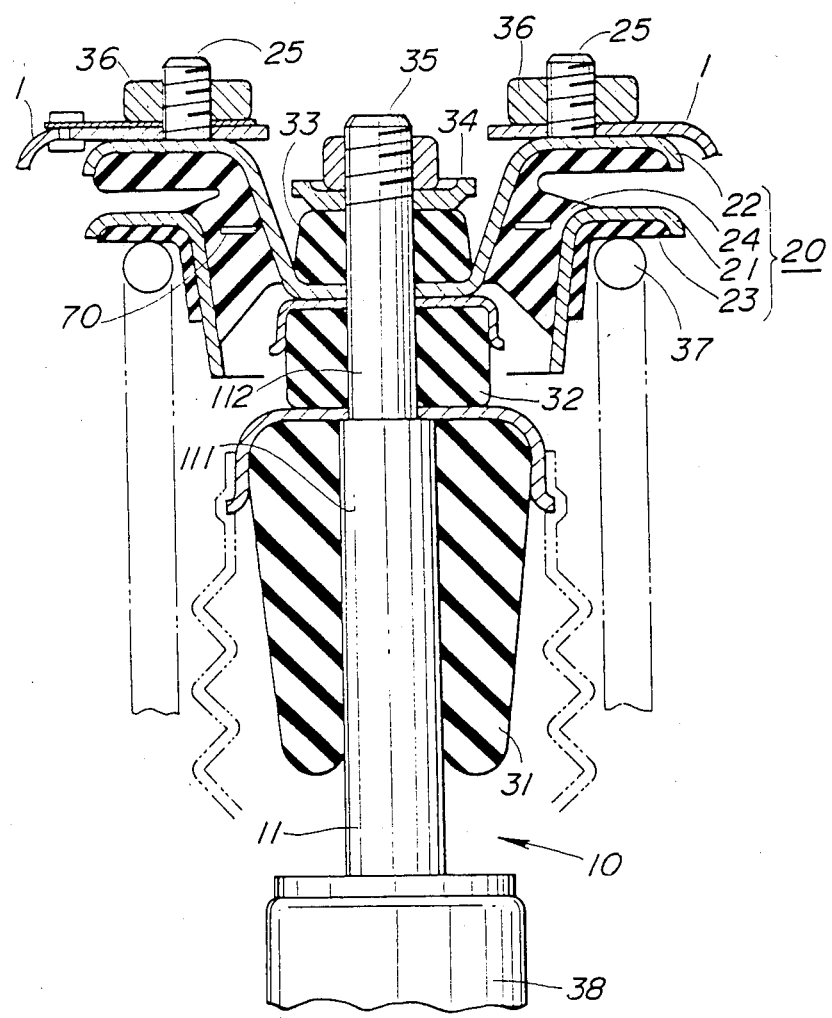
FIG. 13 is a section of a suspension, in which strain gauges, according to the third preferred embodiment of the invention, are provided.
Figure 14:
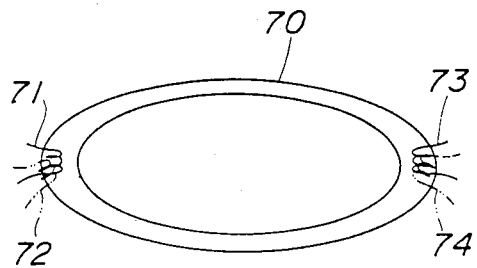
FIG. 14 is a perspective view of a disc provided in the suspension assembly of FIG. 13.
Figure 15:
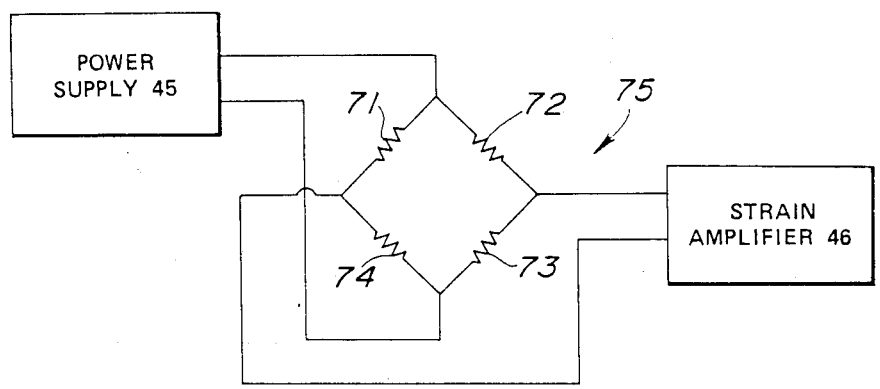
FIG. 15 is a block diagram of a third load-detecting section according to a third preferred embodiment of the invention.

As shown in FIG. 13, a thin metallic disc-shaped member 70 having a central opening is provided in the insulator rubber 24 which constitutes the mount 20. As can be seen from FIG. 14, the disc shaped member 70 has two diametrically opposing strain gauges 71 and 73 formed on its upper surface and two diametrically opposing strain gauges 72 and 74 formed on its lower surface. As in the previously described embodiments, the strain gauges 71 through 74 are formed on the surface of the disc shaped member 70 be means of vapor deposition or sputtering. As shown in FIG. 15, a Wheatstone bridge circuit is formed by connecting the strain gauges 71 to 74 to each other. The Wheatstone bridge circuit is connected to the power supply 45 and the strain amplifier 46 to constitute a third load-detecting section 75.

The load applied by the vehicle body is supported by the insulator rubber 24, the suspension spring 37, a reaction force to the hydraulic pressure in the shock absorber 10 and a reaction force to the air pressure in the tire. The insulator rubber 24 supports a part of the load by a restoring force thereof. Therefore, the amount of load applied by the vehicle body can be detected by the strain gauges 71 to 74 which deform accordance to the deformation of the insulator rubber 24. Since the strain gauge generally can detect the deformation having about 1 to $10^3 \times 10^{-6}$ of $\Delta l/l$ in which l is the length of the strain gauge and $\Delta l$ is variation, it can accurately detect even a minute deformation such as the deformation of the insulator rubber 24.

When the load due to the vehicle body is applied to the insulator rubber 24 causing the insulator rubber 24 to deform, the disc 70 integrally formed in the insulator rubber 24 is deformed. According to the deformation of the disc 70, the strain gauges 71 to 74 integrally provided on the disc 70 is deformed. As a result, the amount of load applied to the insulator rubber 24 can be detected.

Figure 16:
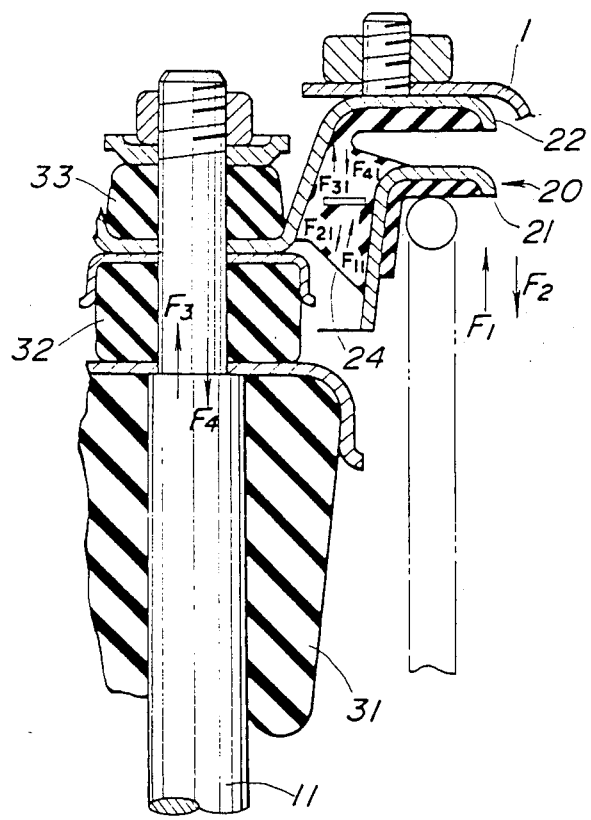
FIG. 16 is a view showing shearing forces exerted on the disc.

The movement of the suspension spring 37 and the transferring of the load to the insulator rubber 24 are described below. When the vehicle is stopped, the load applied by the vehicle body is supported by the wheel and the suspension assembly. A part of the load applied to the suspension assembly is applied to the suspension spring 37 by means of the supporting ring 21. As shown in FIG. 16, a shearing force $F_{11}$ is exerted on the insulator rubber 24 in accordance with the upward pressure of the suspension spring 37, i.e. the spring force $F_1$ so that the disc shaped member 70 provided in the insulator rubber is deformed. Conversely, a shearing force $F_{21}$ is exerted on the insulator rubber 24 in accordance with the downward force $F_2$ of the suspension spring 37 so that the disc provided in the insulator rubber 24 is deformed. As a result, the load applied to the suspension spring 37.

On the other hand, the load applied to the shock absorber 10, which is a part of the load applied to the suspension, is balanced by the reaction force of the hydraulic pressure in the shock absorber 10. In addition, the load applied to the shock absorber body 38 is stably balanced by displacing the shock absorber 10 upwards and downwards. In accordance with the upward and downward movements of the shock absorber 10 (strut force $F_3$ and $F_4$), shearing forces $F_{31}$ and $F_{41}$ are exerted on the insulator rubber 24. As a result, the disc shaped member 70 provided in the insulator rubber 24 is deformed so that the amount of load applied to the shock absorber body 38 can be detected.

The load detected while the vehicle is stationary can be used in the manner as described for the first preferred embodiment.

The load applied by the vehicle body while the vehicle is moving is described below.

While the vehicle travels, the load applied by the vehicle body is supported by the insulator rubber 24, the suspension spring 37, a reaction force to the hydraulic pressure in the shock absorber 10 and a reaction force to the air pressure in the tire. The load applied to the insulator rubber 24 comprises the load by the suspension spring 37 and the shock absorber body 38, which is similar to that when the vehicle is stopped. The principle, by which the strain gauges 71 to 74 provided in the insulator rubber 24 detect the load applied to the insulator rubber 24, is similar to that when the vehicle is stopped. In addition, the load detected while the vehicle travels can be used in the same manner as that in the first preferred embodiment.

The fourth preferred embodiment of a load-detecting system according to the invention is described below.

Figure 17:
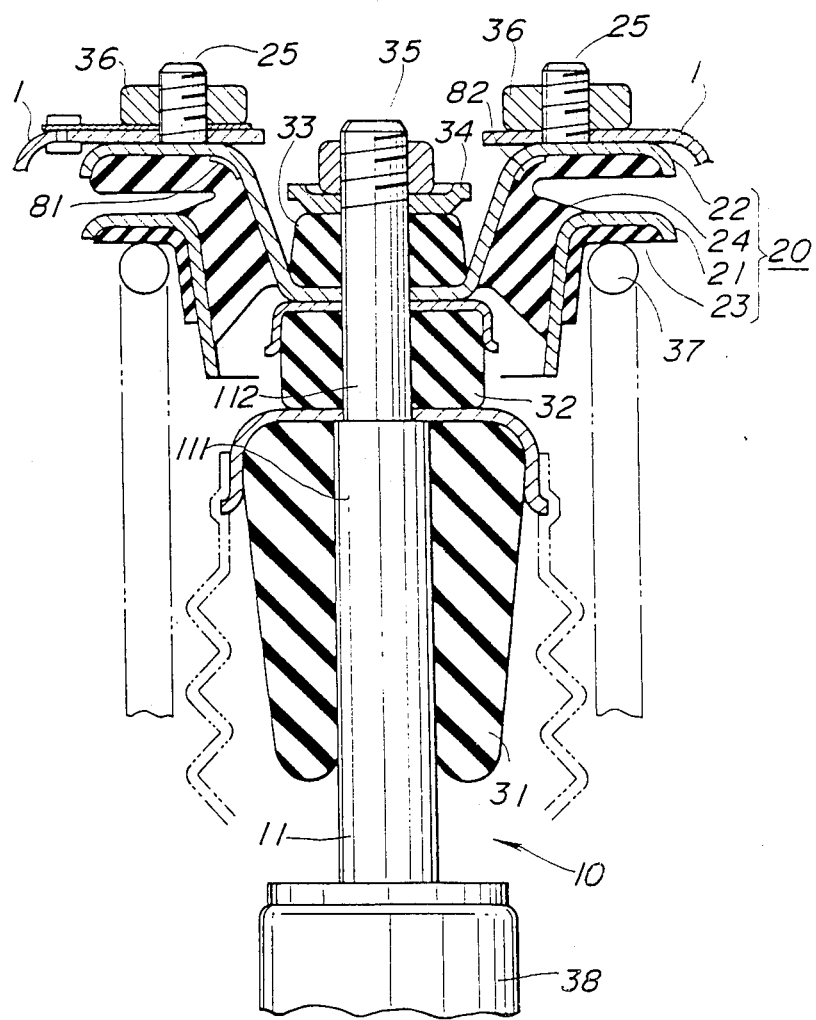
FIG. 17 is a section of a suspension assembly, in which strain gauges, according to the fourth preferred embodiment of the invention, are provided.
Figure 18:
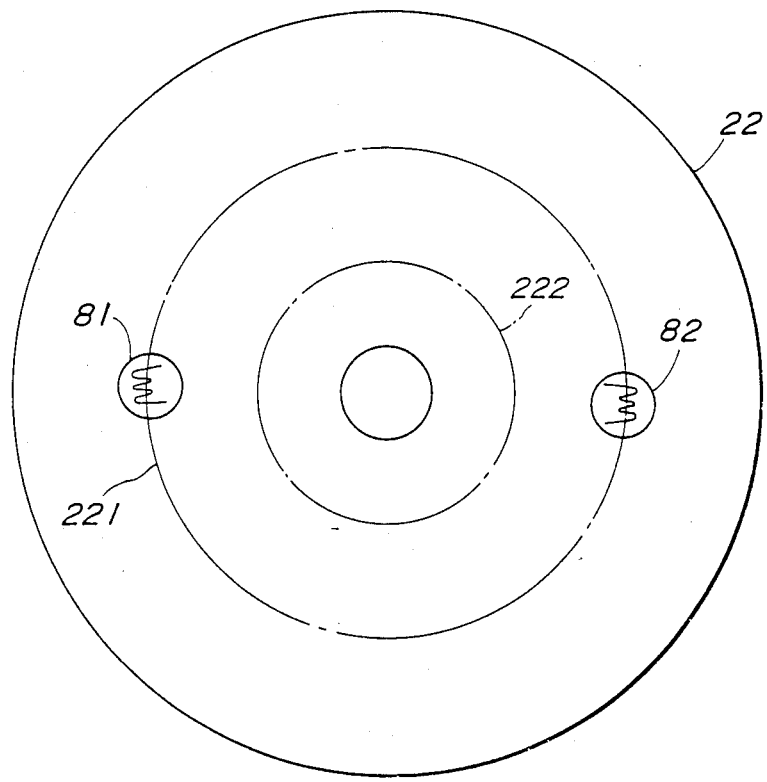
FIG. 18 is a plan view of a mounting portion provided in the suspension of FIG. 17.

As shown in FIGS. 17 and 18, two diametrically opposing strain gauges 81 and 82 are disposed on the mounting portion 22 of the mount 20 at a bending portion 221. The strain gauges 81 and 82 are fixed to the mounting portion 22 by way of sputtering or vapor deposition. Similar to FIG. 3, a Wheatstone bridge is formed by the strain gauges 81 and 82 and a pair of fixed resistors. The Wheatstone bridge is connected to the power supply 45 and strain amplifier 46 to constitute a fourth load-detecting section.

Since the load applied to the suspension assembly and the wheel by the vehicle weight is concentrated on the bending portion 221 of the mounting portion 22 by means of the insulator rubber 24 when the vehicle is stopped, the amount of load applied by the vehicle weight can be accurately detected by means of the fourth preferred embodiment of a load-detecting system according to the invention. In addition, as in the first preferred embodiment various kinds of control can be performed.

While the vehicle is in motion, the tire traction varies in accordance with the road conditions, therefore the amount of load applied to ground by each of the wheels, by which the vehicle body is supported, continually varies. Since the amount of load applied to the ground by the each of the wheels is necessarily transferred to the vehicle body via the mounting portion 22, there is a relationship between the amount of load applied to the ground by the each of wheels and the amount of load applied to the respective mounting portions 22. Therefore, the amount of load applied to the ground by each of wheels can be detected by means of the fourth preferred embodiment. As described in the first preferred embodiment, the vehicle attitude while the vehicle is in motion and road condition can be determined by detecting the amount of load applied to each of the four suspensions assembly, so that the optimum adjustment of the suspension can be achieved.

Figure 19:
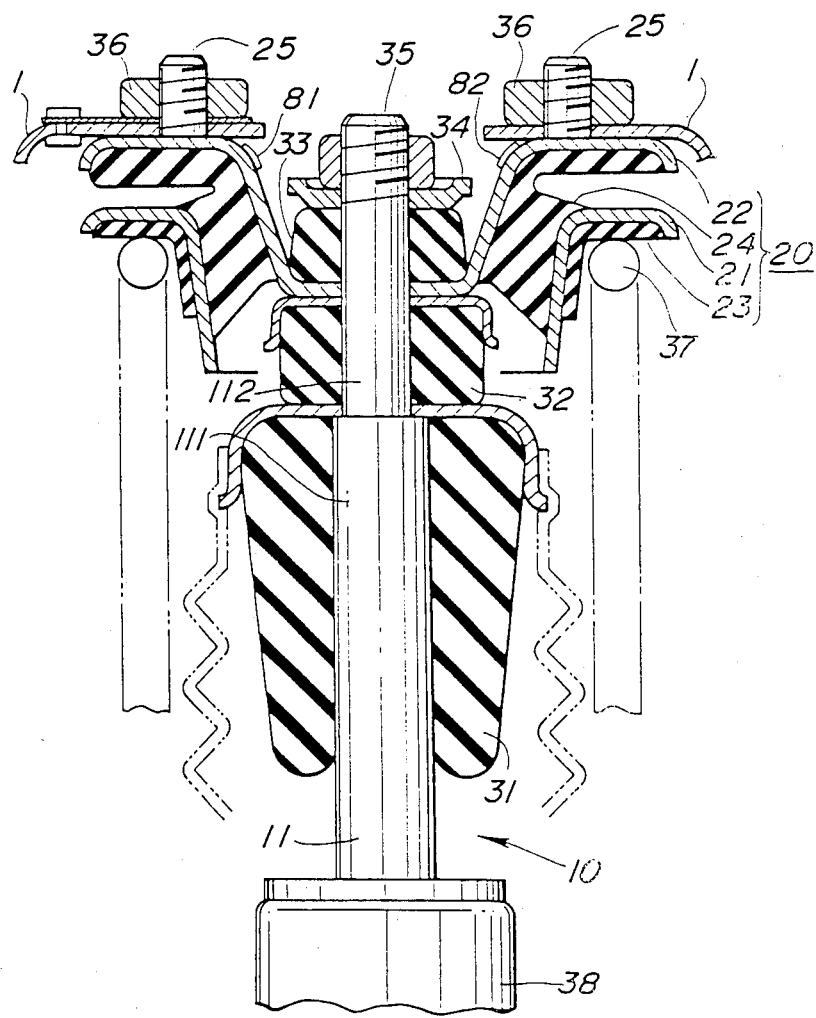
FIGS. 19 and 20 are sections of a suspension assembly in which the strain gauges are provided at different locations according to the fourth preferred embodiment.
Figure 20:
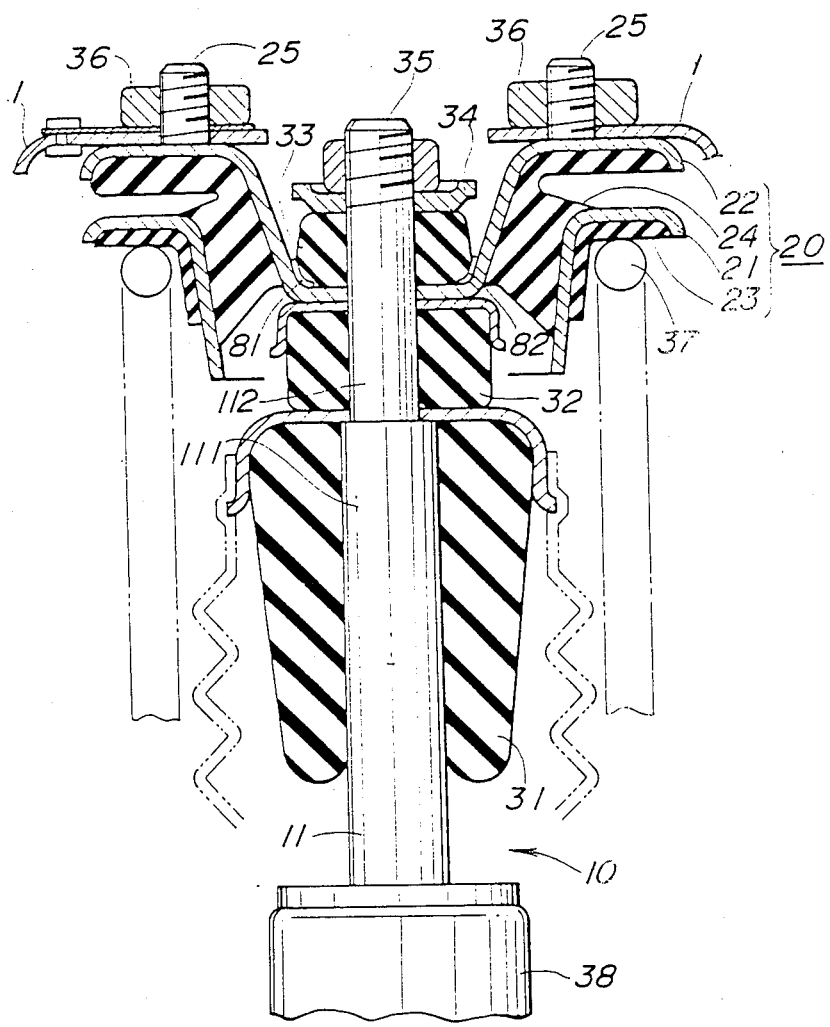

As shown in FIG. 19, according to the fourth preferred embodiment of the invention, the strain gauges 81 and 82 may also mounted on the upper surface of the mounting portion 22 at the bending portion 221. Alternatively, as shown in FIG. 20, the strain gauges 81 and 82 may also mounted on the upper surface of the mounting portion 22 at a bending portion 222 so as to come into contact with the bumper rubber 33.

As mentioned above, since the strain gauges are provided on the selected component of the suspension by way of sputtering or vapor deposition according to the present invention, there are advantages in that:

the strength of with which the strain gauge is attached can be improved as compared with that by means of an adhesive agent;

it can be used for a long period of time at a high temperature (about 450° C. maximum) since an adhesive agent comprising an organic material is not necessary; and the strain gauge may be compact and have high resistance since it is comprised of a thin film having 0.2 to 0.5 $\mu$m of resistance.

What is claimed is:

1. A load detecting system in an automotive suspension assembly, said suspension system including:
a shock absorber, a suspension spring, and a mounting assembly connecting one end of said suspension spring to a vehicle body, and said load detecting system comprising:
a strain gauge provided in said mounting assembly, said mounting assembly being deformed according to the load, and said strain gauge being deformed according to the deformation of said mounting assembly; and
a detecting means for outputting an electrical signal on the basis of resistance of said strain gauge and for detecting the load, the resistance being varied according to the deformation of said strain gauge.

2. A system as set forth in claim 1, wherein said detecting means comprises a Wheatstone bridge, which is formed by said strain gauge and a plurality of fixed resistors, a power supply and a strain amplifier.

3. A system as set forth in claim 1, wherein said mounting assembly comprises:
a supporting ring which supports an upper end of said suspension spring and which is provided between upper and lower ends of said shock absorber of said suspension assembly;
a mounting portion fixed to said vehicle body; and
an elastic insulator rubber which is provided between said supporting ring and said mounting portion.

4. A system as set forth in claim 1, wherein said mounting assembly includes a first member which is deformed according to a load applied to said vehicle body by said shock absorber of said suspension assembly, and wherein said strain gauge is provided in said first member, the resistance of said strain gauge varying according to the deformation of said strain gauge which is deformed according to the deformation of said first member, in order to detect the load applied to the vehicle body by said shock absorber.

5. A load detecting system in an automotive suspension assembly which includes a shock absorber and a suspension spring, one end of said suspension assembly being connected to a vehicle body via a mounting assembly, said mounting assembly including:
a supporting ring which supports an upper end of said suspension spring and which is provided between upper and lower ends of said shock absorber of said suspension assembly, a mounting portion fixed to the vehicle body, and an elastic insulator rubber which is provided between said supporting ring and said mounting portion, said load detecting system comprising:
a strain gauge provided in said mounting assembly which is deformed according to the load, said strain gauge being deformed according to the deformation of said mounting assembly, to cause resistance of said strain gauge to vary; and
a detecting means for outputting an electrical signal on the basis of the resistance of said strain gauge and for detecting the load, said detecting means including a Wheatstone bridge, which is formed by said strain gauge and a plurality of fixed resistors, a power supply and a strain amplifier.

6. A system as set forth in claim 5, wherein said supporting ring has an essentially cylindrical portion and a flange provided around said cylindrical portion and is deformed according to a load applied to the vehicle body by said suspension spring, and wherein said strain gauge is integrally fixed to an upper or lower surface of said supporting ring at a portion of a junction between said cylindrical portion and said flange, by sputtering or vapor deposition, in order to detect a load applied to the vehicle body by said suspension spring.

7. A system as set forth in claim 6, wherein said strain gauge includes two strain gauges which are provided on said supporting ring at two diametrically opposing locations of said junction.

8. A system as set forth in claim 5, wherein said strain gauge is integrally fixed to said mounting portion by sputtering or vapor deposition, said mounting portion being deformed according to a load applied to said suspension by the vehicle body and a load applied to the vehicle body by said suspension, and said strain gauge being deformed according to the deformation of said mounting portion, in order to detect the load applied to said suspension by the vehicle body and the load applied to the vehicle body by said suspension.

9. A load detecting system in an automotive suspension assembly which includes a shock absorber and a suspension spring, one end of said suspension assembly being connected to a vehicle body via a mounting assembly, said mounting assembly having:
 a first member which is deformed according to a load applied to the vehicle body by said shock absorber of said suspension assembly, said load detecting system comprising:
 a first thin metallic ring-shaped member provided in said first member, said first ring-shaped member being deformed according to the deformation of said first member caused by a load applied to the vehicle body by said shock absorber;
 a strain gauge integrally fixed to said first ring-shaped member by sputtering or vapor deposition, said strain gauge being deformed according to the deformation of said first ring-shaped member to cause resistance thereof to vary; and
 a detecting means for outputting an electrical signal on the basis of the resistance of said strain gauge and for detecting the load, said detecting means including a Wheatstone bridge which is formed by said strain gauge and a plurality of fixed resistors, a power supply and a strain amplifier.

10. A system as set forth in claim 9, wherein said first ring-shaped member includes two diametrically opposing strain gauges.

11. A system as set forth in claim 10, wherein said mounting assembly has a second member which is deformed according to a load applied to the vehicle body by said shock absorber of said suspension assembly, and wherein said strain gauge is deformed according to the deformation of said second member causing the resistance thereof to vary, in order to detect the load applied to the vehicle body by said shock absorber.

12. A system as set forth in claim 11, wherein a second thin metallic ring-shaped member is provided in said second member, and wherein said strain gauge is integrally fixed to said second ring-shaped member sputtering or vapor deposition, said second ring-shaped member being deformed according to the deformation of said second member caused by a load applied to the vehicle body by said shock absorber.

13. A system as set forth in claim 12, wherein said ring-shaped member includes two diametrically opposing strain gauges.

14. A load detecting system in an automotive suspension assembly which includes a shock absorber and a suspension spring, one end of said suspension assembly being connected to a vehicle body via a mounting assembly, said mounting assembly including:
 a supporting assembly which supports an upper end of said suspension spring provided between upper and lower ends of said shock absorber of said suspension assembly, a mounting portion fixed to the vehicle body, and an elastic insulator rubber which is provided between said supporting ring and said mounting portion, said load detecting system comprising:
 a strain gauge provided in said elastic insulator rubber which is deformed according to a load applied to said vehicle body by said suspension spring and said shock absorber, the resistance of said strain gauge being varied according to the deformation of said strain gauge which is deformed according to the deformation of said insulator rubber; and
 a detecting means for outputting an electrical signal on the basis of the resistance and for detecting the load, said detecting means including a Wheatstone bridge which is formed by said strain gauge and a plurality of fixed resistors, a power supply and a strain amplifier.

15. A system as set forth in claim 14, which further comprises a thin metallic disc-shaped member provided in said insulator rubber, said disc-shaped member being deformed according to the deformation of said insulator rubber caused by a load applied to the vehicle body by said suspension spring and said shock absorber, and wherein said strain gauge is fixed to said disc-shaped member by sputtering or vapor deposition, said strain gauge being deformed according to the deformation of said disc-shaped member.

16. A system as set forth in claim 15, wherein said strain gauge includes two diametrically opposing strain gauges.

* * * * *